(12) United States Patent
Shoykhet

(10) Patent No.: US 6,796,739 B1
(45) Date of Patent: *Sep. 28, 2004

(54) TORSIONAL JOINT ASSEMBLY AND METHOD OF MAKING SAME

(75) Inventor: Boris A. Shoykhet, Beachwood, OH (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 357 days.

This patent is subject to a terminal disclaimer.

(21) Appl. No.: 09/625,095

(22) Filed: Jul. 25, 2000

Related U.S. Application Data

(63) Continuation-in-part of application No. 08/895,653, filed on Jul. 17, 1997, now Pat. No. 6,129,477.

(51) Int. Cl.[7] .................................................. B25G 3/34
(52) U.S. Cl. ........................ 403/267; 403/265; 310/52; 310/261; 464/88; 464/903
(58) Field of Search ................................. 403/267, 265, 403/266, 179, 404; 310/52, 61, 261, 262, 10; 464/902, 903, 88

(56) References Cited

U.S. PATENT DOCUMENTS

| | | | | |
|---|---|---|---|---|
| 4,275,122 A | * | 6/1981 | Fisher ........................ | 52/726.1 |
| 4,632,590 A | * | 12/1986 | Tsuchimoto ............ | 403/179 X |
| 4,722,717 A | * | 2/1988 | Salzman et al. ........ | 403/265 X |
| 5,122,704 A | * | 6/1992 | Blakeley et al. .............. | 310/54 |
| 5,665,187 A | * | 9/1997 | Mackellar ................ | 29/525.13 |
| 5,880,547 A | * | 3/1999 | Shoykhet .................. | 310/61 X |

OTHER PUBLICATIONS

An Engineer's Viewpoint on Design and Analysis of Aircraft Structural Joints by Dr. L.J. Hart–Smith McDonnell Douglas Paper MDC 91K0067, Aug. 26–28, 1991.*

Adhesive–Bonded Joints for Composites—Phenomenological Considerations by L.J. Hart–Smith McDonnell Douglas Paper 6707, Mar. 14–16, 1978.*

Adhesively Bonded Joints for Fibrous Composite Structures by L.J. Hart–Smith McDonnell Douglas Paper 7740, Sep. 10–11, 1986.*

* cited by examiner

*Primary Examiner*—Lynne H. Browne
*Assistant Examiner*—David E. Bochna
(74) *Attorney, Agent, or Firm*—William R. Walbrun

(57) ABSTRACT

A torsional joint assembly and method of making same having members of formed of dissimilar materials bonded together at calculated angles to result in essentially singularity-free joints.

6 Claims, 4 Drawing Sheets

TORSIONAL JOINT ASSEMBLY AND METHOD OF MAKING SAME

CROSS-REFERENCE TO RELATED APPLICATIONS

This is a continuation-in-part of pending U.S. patent application Ser. No. 08/895,653 filed on Jul. 17, 1997 now U.S. Pat. No. 6,129,477.

STATEMENT REGARDING FEDERALLY SPONSORED RESEARCH OR DEVELOPMENT

Not applicable.

BACKGROUND OF THE INVENTION

The present invention relates to torsional joint assemblies and methods of making same and more particularly to a joint assembly having a singularity-free joint.

Various techniques are known in the art to form torsional bonded joint assemblies using dissimilar materials. Unfortunately, typically even in good designs there are some small zones along the joint where the stresses are very high. These zones are typically located where the bonding surface reaches the outer or the inner surface of the assembly, and also where the adjacent surfaces create the angles. When the linear elasticity theory is used for mathematical modeling of the assembly, these zones manifest themselves by presence of so called singularity points where the stresses become infinitely large. In reality, if the applied load is high, the material fails at the vicinity of the singularity points and the fracture surface may then propagate through the assembly resulting in the complete structure failure. For moderate loads, the stresses near the singularity points may reach the plasticity limit and the material experiences plactic deformation, leading to crack initiation and growth.

Therefore, it would be advantageous to have a torsional joint assembly which is free of such singularity points.

BRIEF SUMMARY OF THE INVENTION

The present invention relates to a joint assembly and method of making same that includes securing surfaces that are specially configured to essentially eliminate singularity points along the securing joints thereby facilitating an extremely strong bond with a relatively short joint length.

The invention also includes a general purpose joint assembly for co-axially connecting cylindrical members which are formed of different materials having different shear modulai, the assembly essentially eliminating stress singularities along the joint. In one embodiment, the assembly includes a first tubular member formed of a first material having a first shear modulai. The first member is formed around an axis and has a proximal edge at a proximal end and has internal and external surfaces, the internal and external surfaces each being first surfaces. One of the first surfaces forms a first proximal surface at the proximal end, at least a portion of the first proximal surface sloped radially to the proximal edge so as to define a first angle with respect to the axis.

A second tubular member is formed of a second material having a second shear modulai. The second member has a proximate edge at a proximate end and has inner and outer surfaces, the inner and outer surfaces each being second surfaces. One of the second surfaces forms a proximate surface at the proximate end and the other of the second surfaces forming an incline surface. The proximate surface includes second proximal and second distal surfaces, the second proximal surface separating the second member from the second distal surface. The second distal surface slopes radially to the proximate edge such that the second distal surface conforms to the first proximal surface. At least a portion of the incline surface slopes radially to the proximate edge so as to define a second angle with respect to the axis. The second proximal surface is parallel to the incline surface. The first proximal and second distal surfaces are secured together by an adhesive layer wherein, the first and second angles are a function of the shear modulus. Preferably, in applications providing a thermal barrier, the first material is a glass-epoxy composite and the second material is a metal.

In one embodiment the external surface forms the second distal surface, the inner surface forms the first proximal surface and the outer surface forms the incline surface.

Thus, another object of the invention is to provide a general, all purpose joint configuration for joining two cylindrical member at their ends in a manner which essentially eliminates singularity points along the length of the joint. This is accomplished by choosing bonding angles as a function of various material characteristics as described in detail below.

It is yet another object of the present invention to provide a joint assembly where members of dissimilar material can be bonded in numerous manners including the use of adhesive, as well as brazing, soldering and other bonding techniques, such as in the case of bonding dissimilar metals together.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Theory

Figure 1:
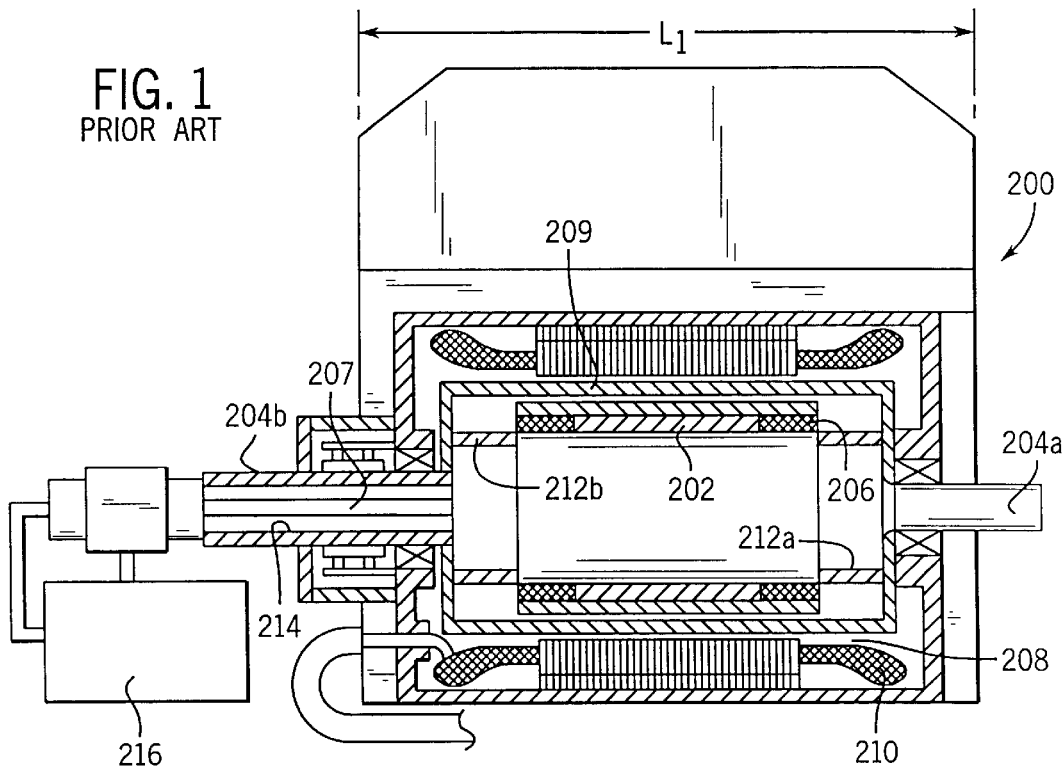
FIG. 1 is a partial cross-sectional view of a prior art superconducting motor system.

In the description that follows, the reference numerals throughout the figures and the specification are used to identify the same components, assemblies, systems, directions, angles, etc. In addition, subscripts "c" and "s" are often used to identify parameters related to a composite material and to a metal (e.g. steel) material, respectively. However, in the broadest sense, it should be understood that such designations may also simply refer to one material versus a second material where any two dissimilar materials may be employed in a joint assembly according to the present invention. Where the later description uses an embodiment of composite to metal bonding with adhesive, it should be understood that one can apply the same equations and techniques with other dissimilar materials and bonding materials.

Figure 2:
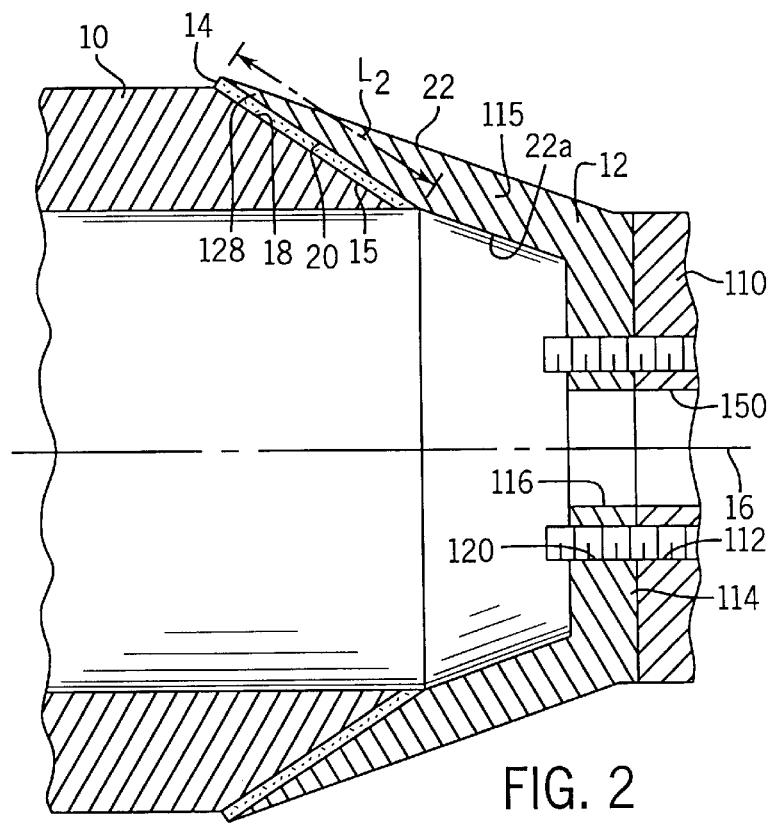
FIG. 2 is a cross-sectional view of a singularity-free joint according to the present invention.

Referring to FIG. 2, the present invention allows two tubular members 10, 12 which are formed of materials characterized by disparate shear moduli, where the modulus associated with the member 12 is larger than the modulus associated with member 10, via an adhesive layer 15, or other bonding material in the case of bonding by brazing or soldering, end to end along securing external and inner surfaces 18, 20 to form a singularity-free securing joint 14 having a length $L_2$. "Singularity-free" means that when torque causes member 12 to rotate about a central axis 16 through member 12, the resulting stresses provided by the solution of the theory of elasticity problem are finite over the whole joint assembly structure, including all locations where one may typically expect infinitely large stresses, such as angular points and the ends of the joint. Therefore the likelihood of joint failure is substantially reduced.

To eliminate singularity points along length $L_2$, angles formed by external and inner surfaces 18, 20 and an incline angle formed by an outer incline surface 22 with respect to surface 20 are precisely chosen. In addition, an inner proximal surface 22a is parallel to surface 22.

It should be appreciated that in practice some stress concentrations will be introduced into a joint. The physical application of a mathematical model will never be exact without some degree of error or round-off. Accordingly, the teachings of the present invention eliminate singularity points in theory, and provide an essentially singularity-free joint in practice. To develop equations which essentially eliminate singularity points, it is helpful to begin with a simple model from which several general conclusions about a singularity-free joint can be derived. To this end, for large tube diameters a specific portion of a joint can be modeled as a two dimensional asymmetrical problem. In order to find singularity point parameters in a closed form, it is also helpful to first consider isotropic materials. Isotropic means that a material exhibits properties with identical values when the values are measured along axis in all directions.

Figure 3:
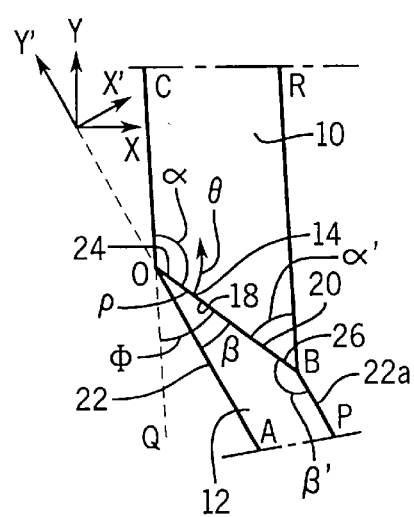
FIG. 3 is a two-dimensional schematic of a section of the joint of FIG. 2 illustrating specific joint tapered angles.

Referring also to FIG. 3, a two-dimensional section of joint 14, without bonding layer 15, is illustrated. For the purposes of this explanation, it will be assumed that member 10 is formed of an isotropic composite material 0 (e.g. glass-epoxy composite) while member 12 is formed of an isotropic metal 0 (e.g. steel). Composite 0 is characterized by a shear modulus $G_c$ while metal 0 is characterized by a shear modulus $G_s$ where $G_c$ is substantially less than $G_s$. Both Polar (è, ñ, z) and first (x,y,z) and second (x',y',z) Cartesian coordinate systems have been superimposed on FIG. 3 with securing joint 14 (i.e., OB) aligned with radial coordinate ñ, the y axis vertical and parallel to the length of member 10 (i.e. CO), the z axis (not illustrated) extending perpendicular to the x and y axes, and the y' axis parallel to external surface 22 (i.e. OA).

The points of interest along securing joint OB are generally adjacent first and second joint ends 24, 26, respectively. It is at these joint ends 24, 26 that singularity points typically first occur. First joint end 24 will be analyzed, then joint end 26 will be separately analyzed and then the results of both analyses will be combined to provide singularity free equations.

At first end 24, external surface 18 forms an angle á (i.e. <COB) with the vertical y-axis. A "composite tapered" angle ö is equal to ∂-á. Inner surface 20 conforms to surface 18 (i.e. to angle ö) and outer surface 22 forms a "metal tapered" angle â with surface 20. Similarly, at second end 26, member 10 forms an angle á' (=∂-á) with the y-axis while member 12 forms an inner angle â'. Equations for singularity point parameters at both ends 24 and 26 can be derived.

With respect to first end 24, the way to determine singularity parameters is as follows. Consider angle AOB and extend lines OA and OB to infinity, so that member 12 becomes a cone with vertex O and angle â. Similarly, consider angle COB and extend line OC and OB to infinity so that member $\grave{U}_c$ also becomes a cone with vertex 0 and angle á. After this artificial extension of actual areas $\Omega_s$ and $\Omega_c$, consider the following homogeneous, two-dimensional, asymmetrical problem:

$$u_z = u(\rho, \theta) \quad \text{Eq. 1}$$

$$\gamma_{\rho z} = \frac{\partial u}{\partial \rho}; \quad \gamma_{\theta z} = \frac{1}{\rho} \frac{\partial u}{\partial \theta} \quad \text{Eq. 2}$$

$$\sigma_{\rho z} = G \gamma_{\rho z}; \quad \sigma_{\theta z} = G \gamma_{\theta z}; \quad G = \begin{cases} G^C & \text{in } \Omega_C \\ G^S & \text{in } \Omega_S \end{cases} \quad \text{Eq. 3}$$

where σ represents stress, $$\frac{\partial^2 u}{\partial \rho^2} + \frac{1}{\rho} \frac{\partial u}{\partial \rho} + \frac{1}{\rho^2} \frac{\partial^2 u}{\partial \theta^2} = 0; \quad 0 < \rho < \infty, -\beta \leq \theta \leq \alpha, \quad \text{Eq. 4}$$

$$\frac{\partial u}{\partial \theta} = 0, \theta = \alpha, \theta = -\beta$$

$$G^S \frac{1}{\rho} \frac{\partial u^S}{\partial \theta} = G^C \frac{1}{\rho} \frac{\partial u^C}{\partial \theta}; \quad u^S = u^C, \theta = 0 \quad \text{Eq. 5}$$

Here and below the solutions in members 12 and 10 are distinguished by upper case indexes S and C, respectively. Next, we must derive solutions to Equations 1 through 5 having the form:

$$u = \rho^\lambda U(\theta) \quad \text{Eq. 6}$$

Substituting Equation 6 into Equations 1 through 5 and simplifying, Equations 1 through 5 reduce to a boundary value problem for an ordinary differential equation as:

$$\lambda^2 U + \frac{d^2 U}{d\theta^2} = 0; \quad \frac{dU}{d\theta} = 0, \theta = \alpha, \theta = -\beta \quad \text{Eq. 7}$$

$$G^S \frac{dU^S}{d\theta} = G^C \frac{dU^C}{d\theta}, U^S = U^C, \theta = 0 \quad \text{Eq. 8}$$

Solutions satisfying the boundary conditions at θ=α, θ=−β, are as follows:

$$U^S = A^s \cos(\lambda(\theta+\beta)); \quad U^c = A^c \cos(\lambda(\theta+\alpha)) \quad \text{Eq. 9}$$

Continuity conditions in Equations 7 and 8 can be used to provide an equation for $\lambda$ such that:

$$\begin{vmatrix} \cos(\lambda\beta) & \cos(\lambda\alpha) \\ G^S\sin(\lambda\beta) & -G^C\sin(\lambda\alpha) \end{vmatrix} = \qquad \text{Eq. 10}$$

$$0 \Rightarrow \kappa\tan(\lambda\alpha) + \tan(\lambda\beta) = 0, \kappa \equiv \frac{G^C}{G^S}$$

The original problem will not have a singularity point at point O if, between $0<\lambda\leq 1$ the only solution to Equation 10 is $\lambda=1$. Therefore, angle $\beta$ to eliminate singularities at point O should be:

$$\beta=\arctan(-\kappa\tan(\alpha)); \text{ or } \beta=\arctan(\kappa\tan(\phi)); \phi=\pi- \qquad \text{Eq. 11}$$

To show that there are no other solutions of Equation 10 in the interval $0<\lambda<1$, make the left-hand side of Equation 10 a function of $\lambda$ such that:

$$f(\lambda)=\kappa\tan(\lambda\alpha)+\tan(\lambda\beta). \qquad \text{Eq. 12}$$

Assuming that angle $\beta$ is given by Equation 11, we get $f(\lambda)=0$ for $\lambda=1$. Function $f(\lambda)$ monotonically decreases when $\lambda$ decreases, and hence it does not have any roots at least in the interval $\alpha/(\pi/2)<\lambda<1$. For $\lambda=\alpha/(\pi/2)$ function $f(\lambda)=-\infty$, and for $0<\lambda<\alpha/(\pi/2)$, function $f(\lambda)$ is positive. Thus, function $f(\lambda)$ does not have any roots within the interval $0<\lambda<1$. It is clear that if angle $\alpha$ is exactly equal to $\pi$, value $\lambda=1$ satisfies Equation 10 only when angle $\beta=\pi$, which is not of interest in our application.

Thus, a first conclusion is that without tapering the securing surfaces of composite material $\Omega_c$ and steel $\Omega_s$, singularity points cannot be eliminated.

Modulus ratio $\kappa$ (see Eq. 10) is relatively small as composite modulus $G_c$ is much smaller than steel modulus $G_s$. Angle $\beta$ is also small while $\alpha$ is close to, but smaller than $\pi$ to ensure that Equation 11 does not provide a negative $\beta$ value. Equation 11 can be represented asymptotically as:

$$\beta\approx\kappa\phi) \qquad \text{Eq. 13}$$

Thus, we arrive at a second conclusion which is that for a small modulus ratio, the ratio of the metal tapered angle $\beta$ to the composite tapered angle $\Phi$ is inversely related to the modulus ratio $\kappa$ (see FIG. 1).

A third conclusion regards stress concentration in metal member 12 corresponding to the case where $\lambda=1$. It follows from Equations 1 through 6 that stresses within member 12 do not depend on radial coordinate $\rho$. Therefore:

$$\sigma_{\rho z}=GU(\theta); \sigma_{\theta z}=GU'(\theta) \qquad \text{Eq. 14}$$

Only radial components $\sigma_{\rho z}$ is discontinuous along joint OB, and this component is of extreme importance. Since both angles $\phi$ and $\beta$ are small, in the vicinity of joint OB component $\sigma_{\rho z}$ is very close to a Cartesian stress component $\sigma_{yz}$ which mainly carries the torque. It follows from Equation 14 that stress in the composite are smaller than in the metal and the ratio of composite to metal stresses can be expressed as:

$$\frac{\sigma_{\rho z}^C}{\sigma_{\rho z}^S}=\kappa \qquad \text{Eq. 15}$$

Thus, the third conclusion is that the metal stress component $\sigma_{\rho z}^s$ is larger than the composite stress component $\sigma_{\rho z}^c$ by the ratio $1/\kappa$.

Referring still to FIG. 3, with respect to second end 26, angle $\alpha'$ is small while angle $\beta'$ is large. Here, $\beta'$ and $\alpha'$ can be substituted into Equation 10 where $\lambda=1$ to express $\beta'$ in terms of $\alpha'$ as:

$$\beta'=\pi-\arctan(\kappa\alpha') \qquad \text{Eq. 16}$$

The asymptotic formula for small values of angle $\alpha$ is:

$$\beta'\approx\pi-\kappa\alpha' \qquad \text{Eq. 17}$$

The reasoning above can be used to prove that Equation 16 is the only solution to Equation 10 in the interval $0<\lambda<1$. In particular, where angle $\alpha'$ is equal to $\phi=\pi-\alpha$, then:

$$\beta'=\pi-\beta \qquad \text{Eq. 18}$$

This particular case is of special interest because there is an elementary analytical solution of an asymmetrical two dimensional elasticity problem for the entire joint OB which theoretically has no singularity point. The solution can be obtained for anisotropic material properties for both members 10 and 12, with the restriction that both materials should be orthotropic and coordinate z-axis should be one of the axis of orthotropy.

Referring still to FIG. 3, for simplicity, it is assumed that in the composite material the x and y-axis are the axis of orthotropy and that in metal material $\Omega_s$, the x' and y'-axis are the axis of orthotropy. Joint OB will be referred to herein as a singularity-free shear joint. It will be assumed that angles $\beta$ and $\phi$ satisfy Equation 11. In this case, as developed above:

$$\tan(\beta)=\kappa\tan(\phi); \text{ where } \kappa=G_{yz}^C/G_{y'z}^S; \qquad \text{Eq. 19}$$

In addition:

$$\left|\frac{AP}{CR}\right| = \frac{\sin\beta}{\sin\theta} \qquad \text{Eq. 20}$$

and:

$$\sigma^a=\sigma^c\sin\phi \qquad \text{Eq. 21}$$

where $\sigma^a$ is an adhesion or bonding stress and $\sigma^c=\sigma_{yz}^c$

Equations describing the asymmetric plane elasticity in member 10 are as follows:

$$u_z=u_z(x,y) \qquad \text{Eq. 22}$$

$$\gamma_{yz}=\frac{\partial u_z}{\partial y}; \gamma_{xz}=\frac{\partial u_z}{\partial x} \qquad \text{Eq. 23}$$

$$\begin{pmatrix}\sigma_{xz}\\\sigma_{yz}\end{pmatrix}=\begin{pmatrix}G_{xz}^C & 0\\0 & G_{yz}^C\end{pmatrix}\begin{pmatrix}\gamma_{xz}\\\gamma_{yz}\end{pmatrix} \qquad \text{Eq. 24}$$

$$\frac{\partial\sigma_{xz}}{\partial x}+\frac{\partial\sigma_{yz}}{\partial y}=0 \qquad \text{Eq. 25}$$

$$\sigma_{xz}=0 \text{ on } OC, BR \qquad \text{Eq. 26}$$

$$\sigma_{yz}=\sigma^c \text{ on } CR \qquad \text{Eq. 27}$$

where $\sigma^c$ is a constant. Equations describing the asymmetric plane elasticity in member 12 are as follows:

$$u_z=u_z(x',y') \qquad \text{Eq. 28}$$

$$\gamma_{y'z} = \frac{\partial u_z}{\partial y'};\ \gamma_{x'z} = \frac{\partial u_z}{\partial x'} \qquad \text{Eq. 29}$$

$$\begin{pmatrix} \sigma_{x'z} \\ \sigma_{y'z} \end{pmatrix} = \begin{pmatrix} G^S_{x'z} & 0 \\ 0 & G^S_{y'z} \end{pmatrix} \begin{pmatrix} \gamma_{x'z} \\ \gamma_{y'z} \end{pmatrix} \qquad \text{Eq. 30}$$

$$\frac{\partial \sigma_{x'z}}{\partial x'} + \frac{\partial \sigma_{y'z}}{\partial y'} = 0 \qquad \text{Eq. 31}$$

$$\sigma_{x'z} 0 \text{ on } OA, PB \qquad \text{Eq. 32}$$

$$\sigma_{y'z} = \sigma^s \text{ on } PA \qquad \text{Eq. 33}$$

where $\sigma^s$ is a constant. It follows from equilibrium conditions that:

$$\sigma^s = \zeta \sigma^c \qquad \text{Eq. 34}$$

where:

$$\zeta \equiv \frac{\sin\phi}{\sin\beta} \approx \kappa^{-1} \qquad \text{Eq. 35}$$

Parameter $\zeta$ is referred to hereinafter as a stress concentration factor. For small tapering angles factor $\zeta$ is essentially equal to the ratio of metal shear modulus $G_s$ to composite shear modulus $G_c$. Note that Equation 34 is similar to Equation 15.

To check the solutions of Equations 34 and 35, with $\sigma_{x'z}=0$, $\sigma_{y'z}=\sigma^s$, $\sigma_{xz}=0$ and $\sigma_{yz}=\sigma^c$:

$$u_z(x', y') = y' \cdot \frac{\sigma^s}{G^S_{y'z}} \text{ in } \Omega^S \text{ and} \qquad \text{Eq. 36}$$

$$u_z(x, y) = y \cdot \frac{\sigma^s}{G^C_{yz}} \text{ in } \Omega^C; \qquad \text{Eq. 37}$$

Equations 36 and 37 satisfy Equations 22 through 33. To check continuity along joint OB, $\sigma^a$ (the adhesion stress) is assumed to be the shear stress on joint OB. Stress continuity along joint OB exists if:

$$\sigma^a = \sigma^s \sin\beta = \sigma^c \sin\phi \qquad \text{Eq. 38}$$

Assuming l is the direction B0 (see FIG. 3) then:

$$l = \begin{pmatrix} \sin\beta \\ \cos\beta \end{pmatrix}$$

in the x'y' system and Eq. 39

$$l = \begin{pmatrix} \sin\phi \\ \cos\phi \end{pmatrix}$$

in the xy system. Eq. 40

Displacement continuity conditions can be expressed as:

$$\frac{\partial u^C_z}{\partial 1} = \frac{\partial u^S_z}{\partial 1} \Leftrightarrow \frac{\sigma^S}{G^S_{x'z}}\cos\beta = \frac{\sigma^C}{G^C_{xz}}\cos\phi \qquad \text{Eq. 41}$$

Equation 41 is satisfied because of the relationships expressed in Equations 11, 34 and 35.

Thus, to design a singularity free shear joint, the following steps should be taken:

(1) First, with a known adhesion stress (i.e. $\sigma^a$) and known composite stress value $\sigma^c$, the composite taper angle $\phi$ is determined from Equation 38. Equation 38 is repeated here as Equation 42:

$$\sin\phi = \frac{\sigma^a}{\sigma^c} \qquad \text{Eq. 42}$$

(2) Second, knowing the composite and metal shear moduli $G_{yz}^c$ and $G_{y'z}^s$, respectively, Equation 19 is used to find metal tapering angle $\beta$. Equation 19 is repeated here as Equation 43.

$$\tan\beta = \kappa\tan\phi, \qquad \text{Eq. 43}$$

$$\kappa \equiv \frac{G^c_{yz}}{G^s_{y'z}}$$

(3) Third, Equations 34 and 35 (repeated as Eqs. 44 and 45) are used to determine shear stresses in metal member 12:

$$\sigma^s = \zeta\sigma^c \qquad \text{Eq. 44}$$

$$\zeta \equiv \frac{\sin\phi}{\sin\beta} \qquad \text{Eq. 45}$$

The solution derived above can be extended to a joint with a bonding layer between members 10 and 12, and to the case of general orthotropy of material properties for all regions. Stress and strains in each member 10 are constant, while displacement $u_z$ is a linear function of coordinates. Consider vector $\vec{\sigma}$, whose components are stresses $\sigma_{xz}$, $\sigma_{yz}$. Also consider vector $\vec{\nabla}$, which is equal to the gradient of displacement $u_z$. If material is isotropic, vectors $\vec{\sigma}$ and $\vec{\nabla}$ are parallel. Vectors $\vec{\sigma}$ and $\vec{\nabla}$ are also parallel, if material is orthotropic with vector $\vec{\sigma}$ parallel to one of the axis of orthotropy (e.g. like the above case, where vector $\vec{\sigma}$ in material $\Omega_c$ is parallel to the y-axis where the y-axis is the axis of orthotropy). Since vectors $\vec{\sigma}$ and $\vec{\nabla}$ are related to each other through elasticity law, vector $\vec{\sigma}$ may be chosen arbitrarily, and vector $\vec{\nabla}$ will be determined from elasticity law. Assuming each member 10, 12 has two edges parallel to vector $\vec{\sigma}$, there are no stresses at the parallel edges.

Vectors $\vec{\sigma}^1$ and $\vec{\nabla}^1$ are chosen in member 10 where member 10 has edges parallel to vector $\vec{\sigma}^1$. Now member 10 is cut along the line comprising some angle $\phi$ to the parallel edges. Angle $\phi$ is arbitrary and referred to as the composite tapered angle. The resulting third edge of member 10 will be sheared by a third edge of member 12. From continuity conditions, component $\sigma_n$ of vector $\vec{\sigma}^1$, which is normal to the third edge, is continuous. In addition, a component $\nabla_\tau$, tangent to vector $\vec{\nabla}^1$ is continuous. Then, from elasticity law, in member 12, vectors $\vec{\sigma}^2$ and $\vec{\nabla}^2$ may be found. The direction of vector $\vec{\sigma}^2$ defines the direction of the stress free edges of wall 12. This process may be continued to add more regions to this chain. Once material properties of the next region are decided upon, the only parameter which is an arbitrary one is the tapered angle.

Referring again to FIGS. 2 and 3, bonding layer 15 of constant thickness is placed between members 10 and 12. Since adhesive 15 contact lines with adherends 10 and 12 are parallel, components $\sigma_n$ and $\nabla_\tau$ on both securing surfaces 18 and 20 are the same. Thus, metal tapering angle $\beta$ is the same as before. Thus, a fourth conclusion related specifically to the case where a bonding layer is provided between two securing surfaces 18 and 20 is that design steps 1 through 3 are not influenced by the adhesive thickness or its elastic properties.

FE analysis showed that for a steel±45° glass-epoxy composite tube joint, even with tube radius of as small as 1 inch for a thickness of 0.25 inches, stresses along a securing joint 14 differed less than 10% from ideal uniform distribution when the inventive joint was employed.

Thus, it should be appreciated that the relatively complex mathematics above yield a relatively simple set of three equations which can be used to determine characteristics of a joint between two tubular members having disparate shear modulus wherein the resulting joint is essentially singularity-free and has practically uniform bonding stress distribution. In addition to providing an extremely strong bond between two tubular members, the inventive joint is also advantageous in that it is relatively short and is simple and inexpensive to construct.

In the superconducting motor environment, the inventive bond is particularly advantageous in that joint length, strength and cost are all important design criteria. In addition, the inventive joint allows a thermally insulating material (i.e., the composite) to be adhesively bonded to metal without singularity points along the joint. In an example application, the inventive joint can be used to form composite-metallic torque tubes which can withstand massive torque levels associated with large motor shafts.

B. Torque Tube Configuration

Figure 4:
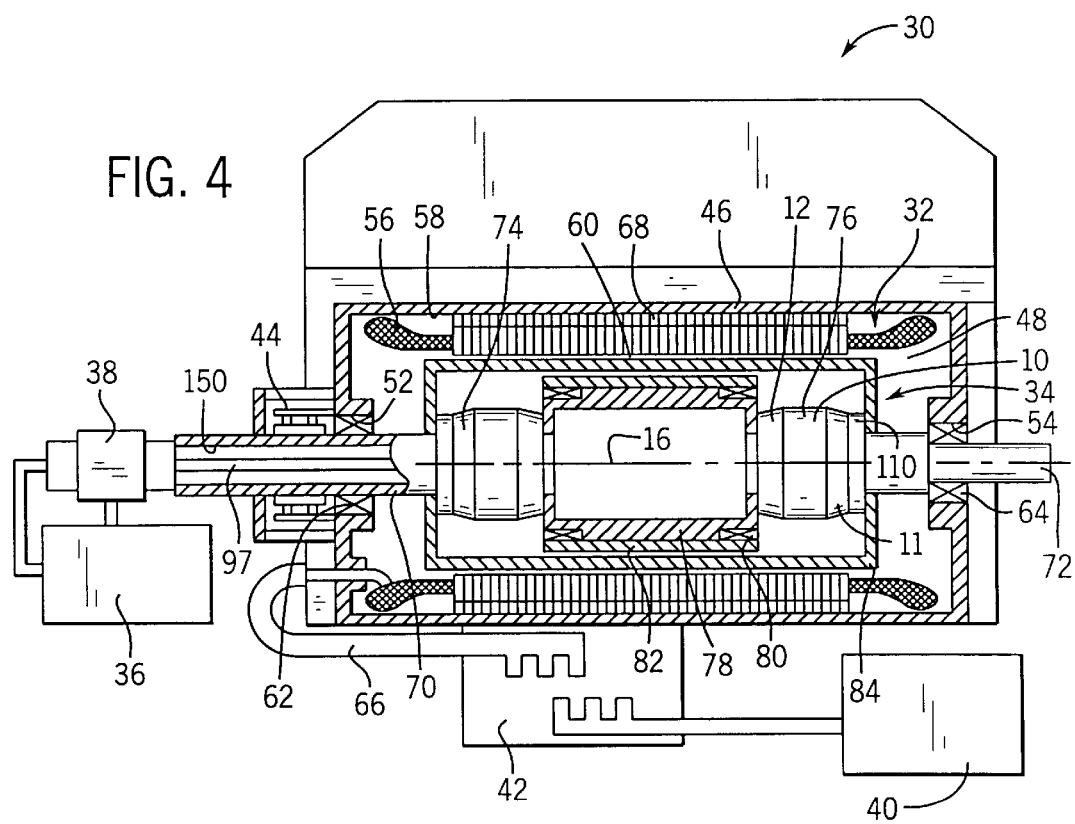
FIG. 4 is a partial cross-sectional view of a superconducting motor, including torque tubes according to the present invention.

Referring now to FIG. 4, the present invention will be described in the context of a superconducting motor system 30. System 30 includes a stator assembly 32, a rotor assembly 34, a cryogenic refrigeration system 36, an agent transfer coupling 38, an inverter 40, a connection box 42, a synchronous DC exciter 44 and various other components which will be described in more detail below.

Stator assembly 32 includes a cylindrical motor frame 46 which forms a motor chamber 48 about a rotation axis 16, frame 46 forming first and second shaft openings 52, 54 at opposite ends which are centered along axis 16. A plurality of stator windings collectively referred to by numeral 56 are mounted on an internal surface 58 of frame 46, windings 56 forming a stator cavity 60 therebetween. Two ball bearings 62, 64 are provided, one at each opening 52, 54, respectively. Supply lines 66 (only one is shown) connect windings 56 through box 42 to inverter 44 for supplying voltages to windings 56 as well known in the art. A laminated flux shield 68 is provided between frame 46 and windings 56.

Figure 5:
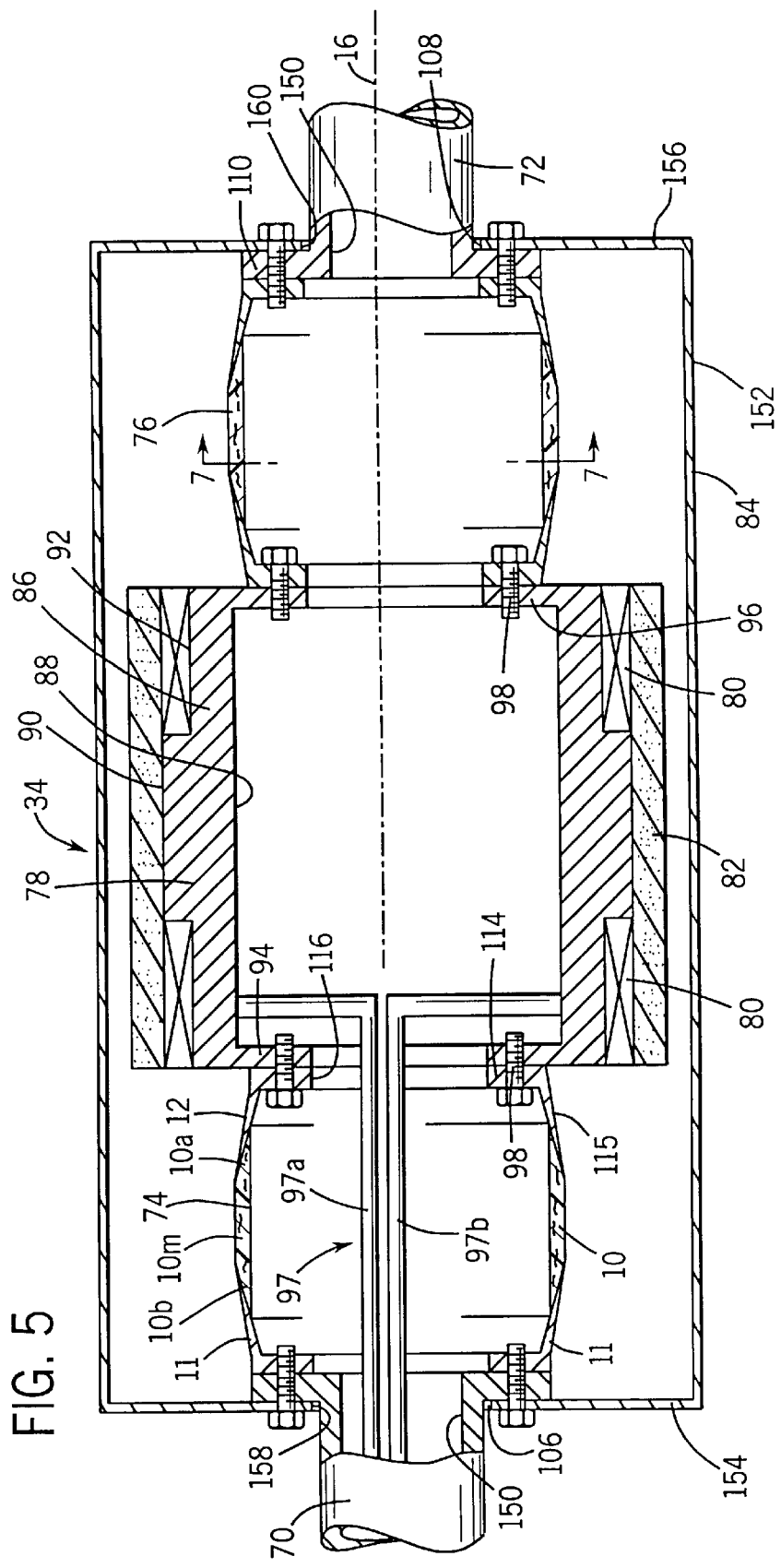
FIG. 5 is an enlarged cross-sectional view of the rotor assembly of FIG. 4.
Figure 6:
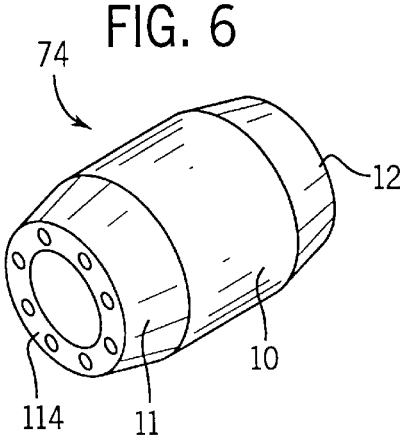
FIG. 6 is a perspective view of a torque tube according to the present invention.
Figure 7:
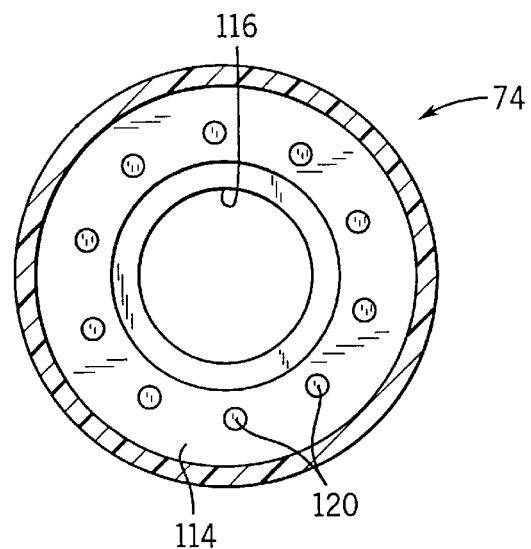
FIG. 7 is a cross-sectional view taken along the line 7—7 of FIG. 5.

Referring also to FIG. 5, rotor assembly 34 includes first and second shaft ends 70, 72, respectively, first and second torque tubes 74, 76 respectively, a coil support 78, rotor coils collectively referred to by numeral 80, an AC flux shield 82 and an outer vacuum jacket 84.

Support 78 includes a generally cylindrical member 86 having an internal surface 88 and an external surface 90. External surface 90 forms a plurality of recesses collectively referred to by numeral 92 for receiving windings 80. First and second annular flanges 94, 96, respectively, extend radially inwardly from surface 88 at opposite ends of member 86. Each flange 94, 96 forms a plurality of bolt receiving apertures collectively referred to by numeral 98 which are parallel to axis 50 and are equispaced about an associated flange 94 or 96.

Windings 80 are wound about member 86 within recesses 92 as well known in the art. Shield 82 is provided outside windings 80 and is spaced apart therefrom.

Tubes 74 and 76 are essentially identical and therefore, only tube 74 will be explained in detail here. Referring to FIGS. 5 through 8, tube 74 consists of three separate components including a thermally insulating composite cylinder 10 and first and second stainless steel couplers 11 and 12 adhesively secured to opposite proximal and distal ends 10a and 10b of cylinder 10. Adhesive is identified be reference numeral 15 in FIG. 2. Couplers 11 and 12 are identical, construction of ends 10a and 10b is identical and characteristics of the bonds between couplers 11, 12 and cylinder 10 are identical and therefore only coupler 12, end 10a and the bond therebetween will be explained her in detail.

Cylinder 10 has a midsection 10m between ends 10a and 10b. Along midsection 10m, cylinder 10 is completely cylindrical, defined by uniform internal and external diameters. However, at each end 10a and 10b, cylinder 10 forms a frusto-conical tapered external surface 18 which slopes radially inwardly from the midsection 10m to an adjacent end of the cylinder 110 (see FIG. 3).

Coupler 12 includes a circular end plate 114 and an integrally connected flange 115. Plate 114 forms a large central aperture 116 and a plurality of circumferentially equispaced bolt apertures around aperture 116, the bolt apertures collectively referred to by numeral 120. Apertures 120 are arranged such that they are alignable with apertures 98.

Flange 115 extends from the circumferential edge of plate 114. Referring specifically to FIG. 2, flange 115 is defined by inner and outer surfaces 20, and 22, respectively, inner proximal surface 22a has a frusto-conical shape which slopes radially outwardly and axially away from plate 114. Inner surface 20, also has a frusto-conical shape which slope radially outwardly and axially away from plate 114. However, surface 20 slopes outwardly to a greater degree than surface 22a. Outer surface 22, also referred to as an inclined surface, also has a frusto-conical shape which slopes radially outwardly and axially away from plate 114 and is parallel to surface 22a such that surfaces 20 and 22 intersect at a distal end 128 of flange 115. In addition, surface 20 slopes outwardly to the same degree that surface 18 slopes inwardly such that surface 20 is parallel to surface 18 at all points. Referring to FIG. 3, surface 22a is BP, surface 22 is OA, and surfaces 18 and 20 are OB as marked.

When secured together, surface 20 is adhered to surface 18 (see FIG. 2). The spacial relationship between plate 114 and internal surface 20 is such that, when surface 20 is parallel to surface 18, plate 114 is perpendicular to midsection 10m.

Referring to the mathematics described above and to FIGS. 2 and 3, tapered angles ö and â are illustrated. The three step process described above is used to determine both the composite tapered angle ö and the metal tapered angle â. Once angles ö and â have been determined, cylinder 10 and flanges 115 can be formed.

Referring to FIGS. 2 through 7, after surfaces 18, 20, 22a and 22 which define angles ö and â have been formed, tube 74 can be assembled. To assembly tube 74, an adhesive 15 is evenly applied to surface 18. Preferred adhesives are HYSO EA-9330, HYSOL EA 9628 and AF-563. Then, coupler 12 is positioned adjacent cylinder 10 such that end 10a is received inside flange 115 with surface 20 parallel to surface 18 and in contact with adherend 15. Adherend 15 is allowed to cure forming a strong bond between coupler 12 and cylinder 10. Coupler 11 is secured to cylinder 10 in a similar fashion.

Referring again to FIG. 2, 4 and 5, first shaft end 70 is cylindrical and hollow and forms a radially outwardly projecting extension 110. Extension 110 forms a plurality bolt apertures 112 which are parallel to axis 16, equispaced around extension 110 and should be arranged so as to align with apertures 120.

Second shaft end 72 is similar shaft end 70 except that it is not hollow. Although not illustrated, end 72 is configured so as to be securely attachable to a load (i.e. end 72 is a drive shaft).

Vacuum jacket 84 includes a generally cylindrical lateral wall 152 and first and second end walls 154, 156 on opposite ends of wall 152. Walls 154 and 156 each form a central aperture 158, 160, apertures 158 and 160 alignable along rotation axis 16. Jacket 84 should be formed of stainless steel. A seal 106, 108 is provided along the edge of each aperture 158, 160, respectively.

To assemble assembly 34, tube 74 is positioned so that extension 114 is adjacent extension 110 with apertures 120 aligned with apertures 98. Nuts and bolts are used to secure tube 74 to supporter 78. Similarly, tube 76 is attached to flange 96. When so attached, tubes 74 and 76 should only contact support 78 via flanges 94 and 96.

With windings 80 arranged inside recesses 92 and shield 82 secured adjacent windings 80, shaft end 70 and wall 154 are attached to end plate 11 via bolts and nuts. Similarly, shaft end 72 and wall 156 are attached to the distal end of tube 76 (see FIG. 5). A cryogenic delivery tube 97, including supply and return sections 97a and 97b, respectively, extends through end 70 and tube 74 into supporter 78 as well known in the art. Tube 97 provides cryogenic coolant to supporter 78.

When assembly 34 is configured in the manner described above and as illustrated in FIGS. 2 through 7, tubes 74 and 76 and supporter 78 are coaxial around axis 16.

Referring again to FIG. 4, refrigeration system 36, transfer coupling 38, exciter 44, connection box 42, delivery tube 97 and inverter 40 are all well known in the art and therefore will not be explained here in detail.

Referring still to FIG. 4, assembly 34 is mounted inside cavity 60 so that a gap exists between the external surface of jacket 84 and stator windings 56. Shaft ends 70, 72 extend axially outwardly along axis 16 and are supported by bearings 62, 64 within openings 158, 160. First end 70 is connected to transfer coupling 38. Tube 97 extends through coupling 36 to system 16 for receiving cooling agent for delivery to support 78. The agent cools windings 80 through supporter 78.

Figure 8:
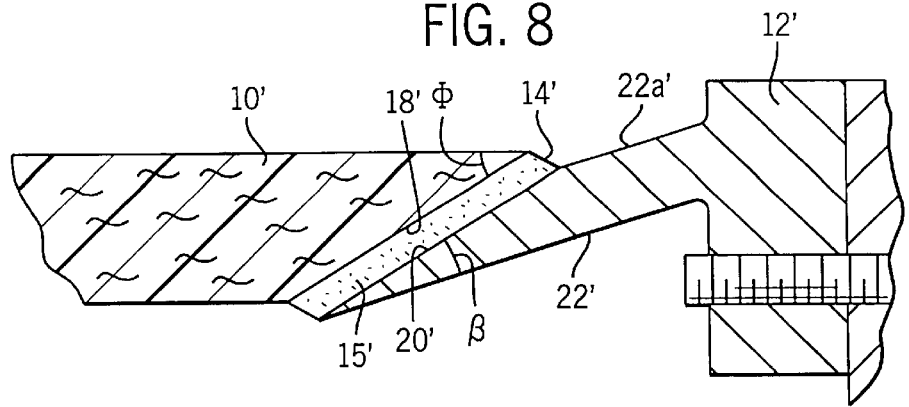
FIG. 8 is similar to FIG. 2, albeit being a second embodiment of a joint according to the present invention.

It should be understood that the methods and apparatuses described above are only exemplary and do not limit the scope of the invention, and that various modifications could be made by those skilled in the art that would fall under the scope of the invention. For example, while the invention is described as including a torque tube formed from a composite conduit and two steel end ring couplers, clearly, the couplers could be formed as integral pieces of the shaft and the internal surface of the support, the shaft and internal surface forming the securing inner and outer surfaces at the angles described above. In addition, while the invention is described as one wherein a composite external surface forms the composite securing surface, an inner surface of the coupler forms the metal securing surface and an outer surface of the coupler forms the incline surface, the invention could also be practiced where a composite internal surface forms the composite securing surface, an outer surface of the coupler forms the metal securing surface and an inner surface of the coupler forms the incline surface. FIG. 8 illustrates a single two-dimensional section of a joint configured in accordance with this second embodiment. In FIG. 8, components, angles and surfaces which are similar to components, angles and surfaces in FIGS. 2 through 7 are identified by the same numbers, albeit further distinguished by a "'". Thus, 10' is a composite member, 12' a metal member, 14' a joint, 15' an adhesive layer and so on. In FIG. 8, internal surface 18' of member 10' is the composite securing surface, surface 20' is the metal securing surface, distal outer surface 22' is the incline or inner surface and 22a' is a metal proximal surface or proximate outer surface. Angles â and ö are as illustrated. The three step procedure described above is used to find angles ö and â thus producing an essentially singularity-free joint 14'.

Furthermore, while it is preferred that the first and second angles be determined according to the equations above, clearly, other similar angles could be used although the likelihood of a singularity point may be increased. In this respect, in a broad sense, the invention is meant to cover any composite/metal torque tube wherein joints between composite and metal are secured via an adhesive. Moreover, the invention is also meant to generally cover bonding of two cylindrical members end to end wherein the materials have disparate shear modulus. While the bonding of some materials may utilize a bonding material of adhesive, other bonding, such brazing or soldering will be best suited for the bonding process of depending on the materials used and desired application. To this end, the Equations above should be used to identify precise first and second angles.

To apprise the public of the scope of this invention, we make the following claims.

I claim:

1. A joint assembly comprising:

a first member having a first surface at a first angle to an external surface of the first member and formed of a first material;

a second member having a second surface at a second angle to an outer surface of the second member and formed of a second material which is different from the first material, each of the first and second materials being characterized by a shear modulus and the second angle being a function of the shear modulus of the first and second materials and of the first angle;

a bonding material which bonds the first and second members together, the bonding material being characterized by a bonding stress;

the first angle being determined according to the equation:

$$\sin\phi = \frac{\sigma^a}{\sigma^c}$$

where $\sigma^a$ is the bonding stress and $\sigma^c$ is a shear stress of the first material; and the second angle being determined according to the equation:

$$\tan\beta = \frac{G^c_{yz}}{G^s_{y'z}} \cdot \tan\phi$$

where $G^c_{yz}$ is a shear modulus of the first material in the y-z direction and $G^s_{y'z}$ is the shear modulus of the second material in the y'-z direction where y' is parallel to the outer surface and z is perpendicular thereto.

2. The joint assembly of claim 1, wherein the first material is a thermal insulator and the second material is a metal.

3. The joint assembly of claim 2, wherein the first material is a composite.

4. The joint assembly of claim 1, wherein the bonding material is adhesive.

5. A singularity-free adhesively bonded joint assembly adapted to rotate about a central axis through the joint assembly comprising:

a first member having a first surface at a first angle to an external surface of the first member and formed of composite;

a second member having a second surface at a second angle to an outer surface of the second member and formed of metal, each of the first and second materials being characterized by a shear modulus and the second angle being a function of the shear modulus of the composite and metal and of the first angle;

an adhesive which bonds the first and second members together, the adhesive being characterized by an adhesion stress and the composite is characterized by a composite stress;

the first angle being determined according to the equation:

$$\sin\phi = \frac{\sigma^a}{\sigma^c}$$

where $\sigma^a$ is the adhesion stress and $\sigma^c$ is the composite stress; and the second angle being determined according to the equation:

$$\tan\beta = \frac{G^c_{yz}}{G^s_{y'z}} \cdot \tan\phi$$

where $G^c_{yz}$ is a shear modulus of the composite in the y-z direction and $G^s_{y'z}$ is the shear modulus of the metal in the y'-z direction where y' is parallel to the outer surface and z is perpendicular thereto.

6. A method for forming a singularity-free bonded joint comprising the steps of:

providing a first member having a first surface at a first angle to an external surface of the first member and formed of a first material;

providing a second member having a second surface at a second angle to an outer surface of the second member and formed of a second material which is different from the first material, each of the first and second materials being characterized by a shear modulus and the second angle being a function of the shear modulus of the first and second materials and of the first angle;

connecting the first and second members together with a bonding material, the bonding material being characterized by a bonding stress;

the first angle being determined according to the equation:

$$\sin\phi = \frac{\sigma^a}{\sigma^c}$$

where $\sigma^a$ is the bonding stress and $\sigma^c$ is a shear stress of the first material; and the second angle being determined according to the equation:

$$\tan\beta = \frac{G^c_{yz}}{G^s_{y'z}} \cdot \tan\phi$$

where $G^c_{yz}$ is a shear modulus of the first material in the y-z direction and $G^s_{y'z}$ is the shear modulus of the second material in the y'-z direction where y' is parallel to the outer surface and z is perpendicular thereto.

* * * * *